G. W. COOPER.
CINEMATOGRAPH APPARATUS.
APPLICATION FILED MAR. 16, 1914.

1,259,365.

Patented Mar. 12, 1918.
2 SHEETS—SHEET 2.

WITNESSES

INVENTOR
GEORGE WILLIAM COOPER
BY
ATTORNEY

UNITED STATES PATENT OFFICE.

GEORGE WILLIAM COOPER, OF LONDON, ENGLAND.

CINEMATOGRAPH APPARATUS.

1,259,365.  Specification of Letters Patent.  Patented Mar. 12, 1918.

Application filed March 16, 1914. Serial No. 824,976.

*To all whom it may concern:*

Be it known that I, GEORGE WILLIAM COOPER, a subject of the King of Great Britain and Ireland, and residing at Shaftesbury Hotel, Great St. Andrew's street, Shaftesbury avenue, London, W. C., England, have invented certain new and useful Improvements Relating to Cinematograph Apparatus, of which the following is a specification.

This invention relates to improvements in cinematograph apparatus with special reference to apparatus employed for taking pictures suitable for use with stereoscopic flickerless projection apparatus comprising two lenses the shutters in connection with which are adapted to operate alternately.

Hitherto all attempts to obtain stereoscopic flickerless projection have failed by reason of the difficulty that has been experienced in obtaining identical images upon the films and in superposing the same upon the screen so as to give a correctly focused stereoscopic picture, and it is the object of my invention to provide a form of apparatus which will overcome these difficulties.

According to my invention I provide apparatus for taking pictures for projection by cinematography comprising a pair of lenses whether simple or compound which are movable relatively to one another while their axes remain parallel. In this manner it is possible to obtain identical images upon the films while every part of each of such images will be in focus and a stereoscopic effect will be produced.

The invention also consists in the interposition of a second lens between each image-receiving lens and its corresponding film to bring the image into correct position relatively to the film which lens however may be dispensed with where the apparatus is employed for projecting the pictures.

The invention also consists in the specific form of apparatus hereinafter more particularly referred to.

The accompanying drawings illustrate one mode of carrying out the invention.

Figure 1:
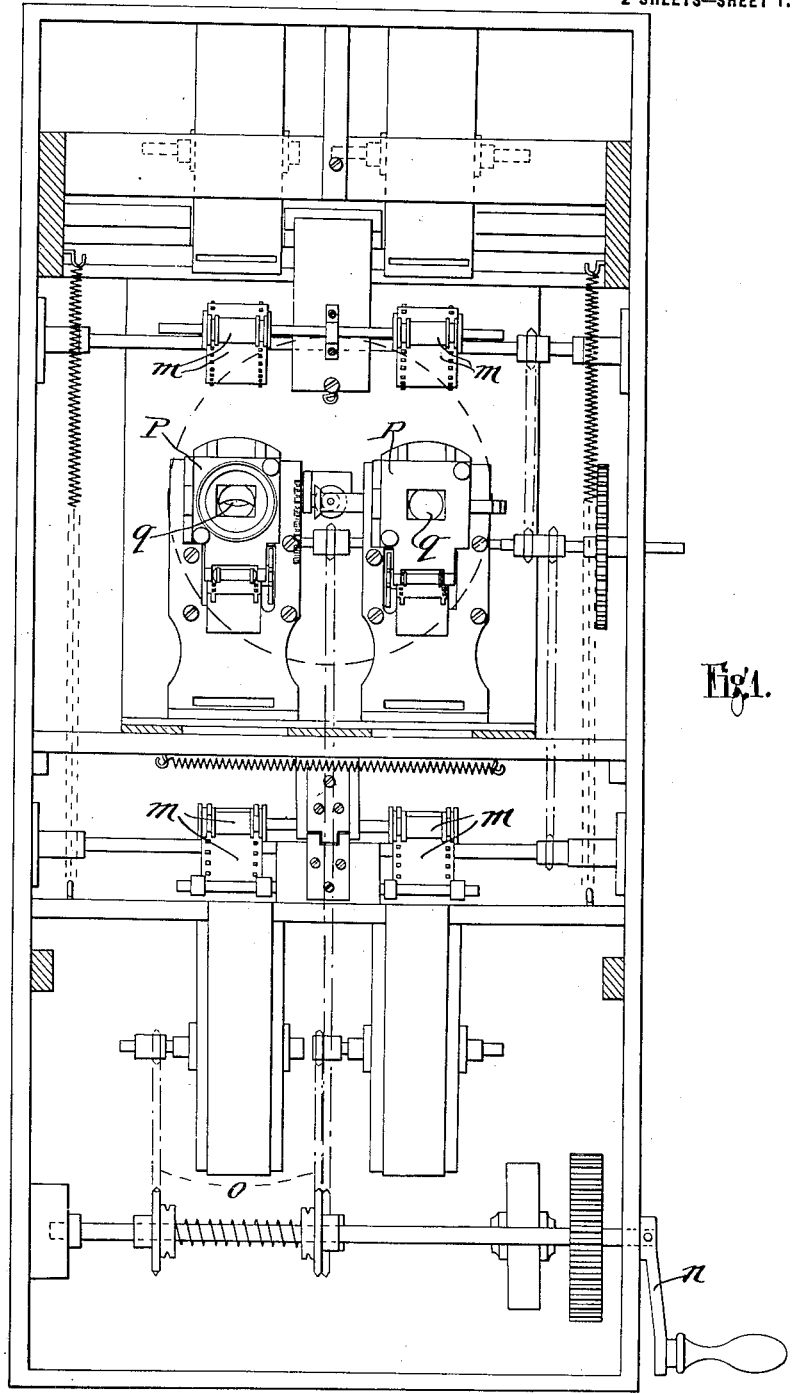
Figure 1 is a rear elevation showing more or less diagrammatically one convenient arrangement of apparatus constructed in accordance with the invention.
Figure 3:
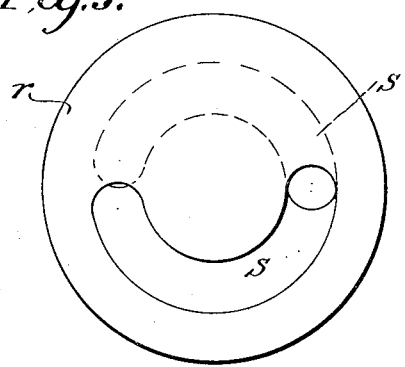
Fig. 3 is a face view of one of the shutters.

In carrying my invention into effect in one convenient manner I employ duplicate sets of mechanism of suitable known construction with corresponding duplicate projecting lenses $a$. For example, the two mechanisms may be as shown in Fig. 1 and consist of film-carrying rolls $m$ $m$ adapted to be rotated by means of a hand-wheel $n$ or other suitable device and chain or other gearing $o$, so that the films $b$ may be drawn through the usual gates $p$ adjacent to the shutters indicated at $q$ (Fig. 1) and illustrated in detail in Fig. 3. The shutters in this form comprise two disks $r$ each of which is provided with a slot $s$ and which are adapted to be rotated in opposite directions so that their operation with respect to the duplicated films $b$ is alternate; that is to say that the shutters are arranged to rotate out of phase so that the films are alternately exposed during the operation of taking the pictures.

The mechanism so far described may be of any suitable known character, so that it is unnecessary to describe the same in detail, it being understood that the various parts composing such mechanisms may be suitably varied both as to their construction and arrangement as may be required to meet varying practical conditions.

Figure 2:
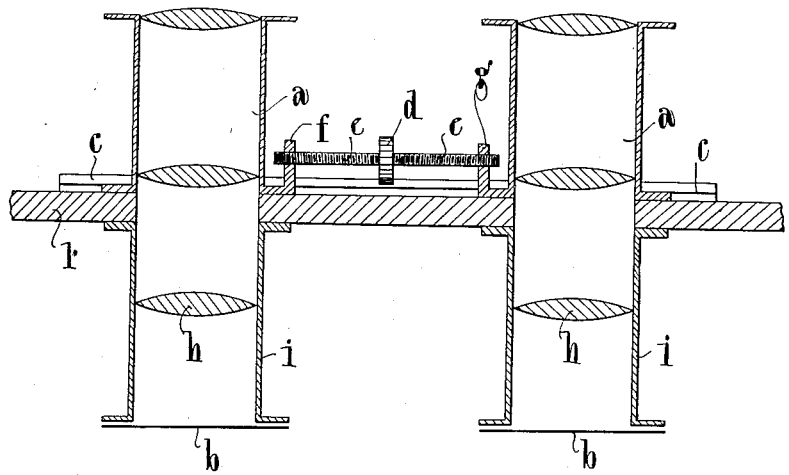
Fig. 2 is a fragmentary view showing in sectional plan one portion of the apparatus illustrated in Fig. 1.

The compound image-receiving lenses, $a$ (Fig. 2) are mounted in slides, $c$ upon the exterior of the casing, $l$, of the apparatus, and any suitable arrangement is provided for moving the lenses toward or away from one another as may be desired, while keeping their axes parallel and at right angles to the plane of the films, $b$. In the construction illustrated the movement of the lenses is caused by rotation of a milled nut, $d$, secured to or formed in one with a right and left hand screw threaded spindle, $e$, the two parts of which are adapted to engage respectively with lugs, *f*, *g*, upon the lenses, *a*, the arrangement being such that upon rotating the milled nut, *d*, in the proper direction, the lenses are caused to move toward one another, the amount of movement that is necessary depending upon the distance between the lenses and the object the image of which is required to be taken upon the films, *b*. It will be clear that with such an arrangement it is possible for the lenses, *a*, to receive practically identical images of the object to be photographed, while at the same time every part of such image will be in focus seeing that the plane of the taking lenses with respect to the object being photographed has not been altered.

For the purpose of bringing the images received by the lenses, *a*, into their correct positions relatively to the films, *b*, I interpose between each of the image-receiving lenses and its corresponding film, *b*, a second lens, *h*, which, for convenience, may be removably mounted in any suitable manner within the tubes or like fittings, *i*, the removability of such lenses being desirable to facilitate focusing and in case it should be required to employ the apparatus that has been used for taking the pictures for subsequently projecting the same upon the screen, it being then unnecessary to employ the additional lenses, *h*.

It will be clear that many variations may be introduced into the manner of giving the necessary movement to the lenses, the above construction being given by way of example only, and the invention is not to be confined to any particular type of construction of stereoscopic cinematograph apparatus nor to any particular character of image-receiving lenses that may be employed in connection therewith.

Having now described my invention, what I claim as new and desire to secure by Letters Patent is:—

1. Cinematograph apparatus comprising two lenses movable laterally relatively to one another while their axes remain parallel, means for supporting a film adjacent to each lens, shutter mechanism adapted to uncover said lenses alternately and a laterally fixed lens interposed between each of said movable lenses and the corresponding film.

2. Cinematograph apparatus comprising two lenses movable laterally relatively to one another while their axes remain parallel, means for supporting a film adjacent to each of said lenses, two oppositely rotating disks each provided with a slot and so arranged that they uncover said lenses alternately and a laterally fixed lens interposed between each of said movable lenses and the corresponding film.

3. Cinematograph apparatus comprising two lenses laterally movable relatively to one another while their axes remain parallel, means for supporting a film adjacent to each of said lenses, shutter mechanism adapted to uncover said lenses alternately and a removably mounted but laterally fixed lens interposed between each of said movable lenses and the corresponding film.

4. Cinematograph apparatus comprising two lenses laterally movable relatively to one another while their axes remain parallel, means for supporting a film adjacent to each of said lenses, two oppositely rotating disks each provided with a slot and so arranged as to uncover said lenses alternately and a removably mounted but laterally fixed lens interposed between each of said movable lenses and the corresponding film.

5. Cinematograph apparatus comprising two lenses, slides for said lenses, means for moving the lenses laterally in said slides, means for supporting a film adjacent to each of said lenses, shutter mechanism adapted to uncover said lenses alternately and a laterally fixed lens interposed between each of said movable lenses and the corresponding film.

6. Cinematograph apparatus comprising two lenses, a slide for each of said lenses, means for moving each lens laterally within its slide, means for supporting a film adjacent to each of said lenses, shutter mechanism adapted to uncover said lenses alternately and a laterally fixed but removably mounted lens interposed between each of said movable lenses and the corresponding film.

7. Cinematograph apparatus comprising two lenses, a slide for each of said lenses, a right and left hand threaded spindle, means upon said lenses engaging said spindle, means for rotating said spindle, supporting means for a film adjacent to each of said lenses, shutter mechanism adapted to uncover said lenses alternately and a laterally fixed lens interposed between each of said movable lenses and the corresponding film.

8. Cinematograph apparatus comprising two lenses, a slide for each of said lenses, a right and left hand threaded spindle, means upon said lenses engaging said spindle, means for rotating said spindle, supporting means for a film adjacent to each of said lenses, two oppositely rotating disks each provided with a slot and so arranged as to uncover said lenses alternately and a laterally fixed lens interposed between each of said movable lenses and the corresponding film.

9. Cinematograph apparatus comprising two lenses, a slide for each of said lenses, a right and left hand threaded spindle, means upon said lenses engaging said spindle, means for rotating the screw threaded spindle, supporting means for a film adjacent to each of said lenses, shutter mechanism adapted to uncover said lenses alternately and a laterally fixed but removably mounted lens interposed between each of said movable lenses and the corresponding film.

In testimony whereof I have signed my name to this specification in the presence of two subscribing witnesses.

GEORGE WILLIAM COOPER.

Witnesses:
HERBERT D. JAMESON,
O. J. WORTH.